No. 717,353. Patented Dec. 30, 1902.
N. M. COX.
SOCKET.
(Application filed June 21, 1902.)
(No Model.)
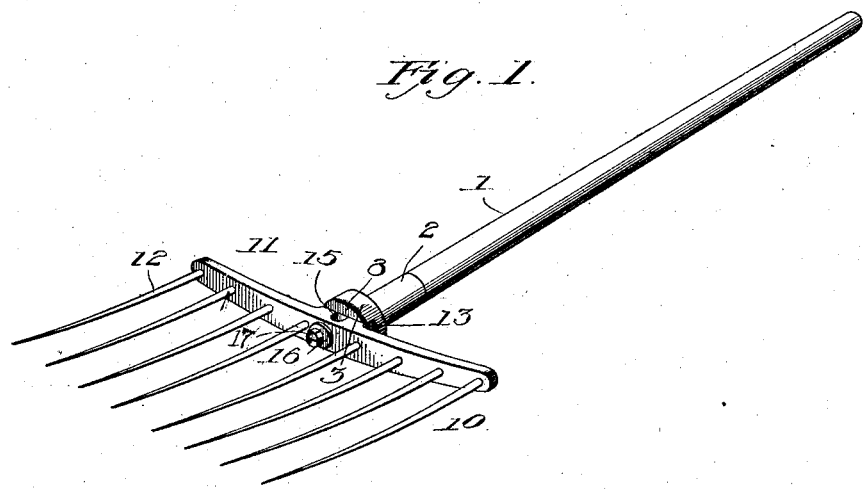
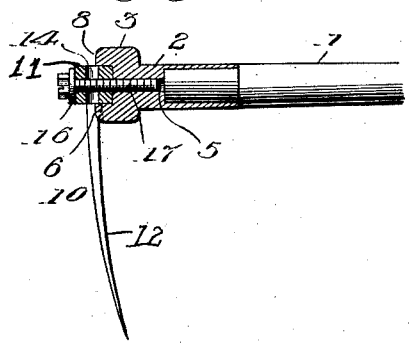
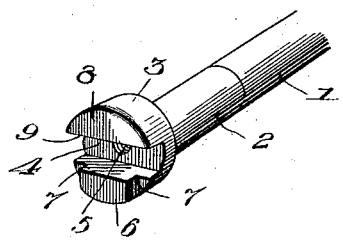
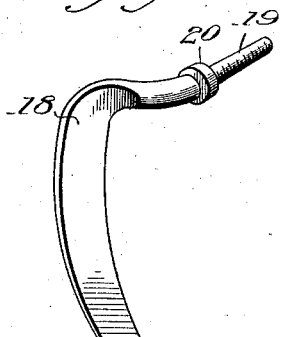
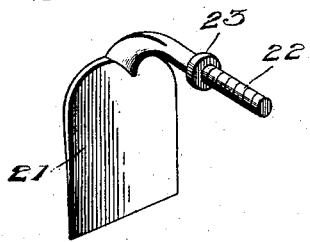
Witnesses
Chas. S. Hyer.
Inventor
Nathan M. Cox,
By Victor J. Evans
Attorney

UNITED STATES PATENT OFFICE.

NATHAN M. COX, OF AI, TENNESSEE.

SOCKET.

SPECIFICATION forming part of Letters Patent No. 717,353, dated December 30, 1902.

Application filed June 21, 1902. Serial No. 112,698. (No model.)

*To all whom it may concern:*

Be it known that I, NATHAN M. COX, a citizen of the United States, residing at Ai, in the county of Putnam and State of Tennessee, have invented certain new and useful Improvements in Sockets, of which the following is a specification.

This invention relates to a socket adapted to be applied to the handles of farm and garden tools for the removal and application thereto of different implements, and coöperating therewith are heads or shanks of the various implements, which are removable in relation to the socket and a part of which may be converted into different implements by a simple change of position.

The object of the present improvement is to provide a handle and socket which may be used with a number of different tools or implements and always have convenient means present whereby an implement or tool may be readily detached from the handle or its position changed at a different angle to serve another purpose.

In the drawings, Figure 1 is a perspective view showing the improved handle and socket and an implement capable of being disposed to provide a fork or a rake, the said implement being arranged as a fork in this figure. Fig. 2 is a longitudinal vertical section of the socket and the implement or tool shown by Fig. 1 disposed as a rake, a portion of the handle being shown in elevation. Fig. 3 is a detail perspective view of the socket and a portion of the handle. Fig. 4 is a detail perspective view of an implement in the form of a cutter for various uses adapted to be removably inserted in the socket. Fig. 5 is a detail perspective view of a hoe attachment for removable insertion in the socket.

Similar numerals of reference are employed to indicate corresponding parts in the several views.

The numeral 1 designates a handle of any suitable length which has secured on the forward extremity thereof a socket 2, provided with an enlarged head 3, having a transversely-extending slot 4 therethrough and opening outwardly at the front. Extending centrally into the shank from the inner wall of the slot 4 is a screw-threaded bore 5, and the lower lip 6, formed on the head by the slot 4, has opposite angular recesses 7 for a purpose which will be hereinafter explained, the upper lip 8 presenting a straight unbroken bearing-wall 9.

The implement or tool 10 (shown by Figs. 1 and 2) is convertible from a fork to a rake, or vice versa, and comprises a head-bar 11 of suitable length, having a plurality of tines or teeth 12 extending therethrough. Projecting from the center of the rear side of the head-bar is a boss 13 of approximately the same contour as the recess 4 and of such dimensions as to be readily inserted in and removed from said recess. Extending transversely through the center of the head-bar 11 and the boss 13 is an opening 14, and intersecting said opening in a plane at right angles is an opening 15, which is mainly located in the boss. When the implement or tool 10 is arranged as a fork, the boss 13 is inserted in the recess 4 of the socket, a washer 16 placed against the center of the outer side of the head-bar over the opening 14, and a screw-bolt 17 then inserted through the said washer and the opening 14 into the screw-threaded bore 5 of the socket, which secures the said screw-bolt and the parts engaged thereby to the socket. It will be seen that the boss 13 prevents the head-bar 11 from having an oscillating movement or obstructs loosening of the screw-bolt. The distance between the outer side of the head-bar 11, as shown arranged by Fig. 1, and the rear edge of the boss 13 is approximately equal to the width of the slot 4 in the socket, and hence the head-bar may be turned in a plane at right angles to that shown by Fig. 1 or in the position shown by Fig. 2 to cause a portion of the head-bar and the boss to fit into the slot 4, and when the said head-bar and boss are thus applied the washer 16 is placed over the opening 15 and the screw-bolt 17 inserted through said latter opening into the screw-threaded bore 5 of the socket.

When the implement 10 is arranged as shown by Fig. 2, it may be conveniently used as a rake. When the implement 10 is disposed as a rake, as shown by Fig. 2, the two tines or teeth on opposite sides of the center and nearer the outer terminal of the opening 14 rest in the recesses 7 and prevent the said implement when in this position from oscillating or having axial movement and serve to hold the head-bar 11 in rigid connected relation to the socket and also prevent loosening of the screw-bolt 17.

The cutting-tool or implement 18 (shown by Fig 4) has a screw-threaded shank 19, with an outer limiting-shoulder 20, adapted to be removably inserted in the screw-threaded bore 5. Likewise the hoe attachment 21 (shown by Fig. 5) has an annularly-disposed screw-threaded shank 22, with an outer limiting-shoulder 23, the said shank of this attachment being also removably attachable to the socket.

From the foregoing disclosure it will be seen that a number of implements can be used with a single socket and may be carried in compact form and transported from one point to another, where the use of all the implements may be necessary in performing certain classes of work, and thereby avoid the procurement and transportation of a number of separate implements which would produce a cumbersome aggregation, as well as entail considerable expense in the purchase of the same in complete form. At times the devices shown by Figs. 1 and 2 will be solely required for use and a convenient construction will be present, whereby a fork may be converted into a rake, or vice versa. It is also proposed to properly curve the tines or teeth 12, so that they will efficiently serve for both fork-tines and rake-teeth. Other implements may also be applied in the same manner as those described, and changes in the proportions, form, and minor details of construction may be resorted to without departing from the principle of the invention.

Having thus fully described the invention, what is claimed as new is—

1. In a device of the class set forth, the combination of a handle having a socket with an enlarged head formed with a transverse slot in the outer portion thereof and a screw-threaded bore extending longitudinally thereinto, and an implement adapted to be removably attached to the said socket and having portions to extend into the recess.

2. In a device of the class set forth, the combination of a handle having a socket with a slot in the front extremity thereof and a screw-threaded bore extending longitudinally thereinto, and an implement having a head-bar with a central boss, openings being formed in the head-bar and boss in planes at right angles to each other, the said head-bar and a portion of the boss being adapted to be removably arranged in the slot of the socket, and means for securing the head-bar and boss to the socket.

3. In a device of the class set forth, the combination of a handle having a socket with an enlarged head at its front extremity provided with a transversely-extending slot and also formed with a longitudinally-disposed screw-threaded bore, and an implement having a head-bar provided with tines adapted to be removably inserted in the slot and disposed in two angular positions in relation to the latter.

4. In a device of the class set forth, the combination of a handle having a socket with a transversely-extending slot in the front extremity thereof and a longitudinally-disposed screw-threaded bore, an implement having a head-bar with a central boss, the head-bar and boss having openings therethrough in planes at right angles to each other and the distance between one side of the head-bar and the free edge of the boss being approximately equal to the width of the slot in the socket, the said implement having tines projecting therefrom, and a fastening device to engage either of the openings and the screw-threaded bore in the socket.

5. In a device of the class set forth, the combination of a handle having a socket with a front enlarged head formed with a transversely-extending slot and providing upper and lower lips, the lower lip having opposite recesses and the socket also formed with a longitudinally-disposed screw-threaded bore, a reversible implement comprising a head-bar having a central boss with openings therethrough in planes at right angles and also provided with tines extending therefrom, and a fastening device to engage either of said openings and the screw-threaded bore of the socket.

In testimony whereof I affix my signature in presence of two witnesses.

NATHAN M. COX.

Witnesses:
F. M. ANDERSON,
CLINT STEEL.